United States Patent [19]
Etwell

[11] 3,921,547
[45] Nov. 25, 1975

[54] DISPENSING ROD LIKE ARTICLES

[75] Inventor: Cecil C. Etwell, Via Mackay, Australia

[73] Assignee: Massey-Ferguson Services N.V., Curacao, Netherlands Antilles

[22] Filed: Dec. 7, 1973

[21] Appl. No.: 422,625

[30] Foreign Application Priority Data
Dec. 28, 1972 Australia.............................. 1744/72
Feb. 1, 1973 Australia.............................. 2099/73

[52] U.S. Cl. .................... 111/1; 111/3; 198/287; 221/171; 221/185
[51] Int. Cl.² .................... A01C 11/00; B65G 47/14
[58] Field of Search ........ 111/1, 2, 3; 221/171, 173, 221/185; 214/518; 198/263, 282, 283, 287

[56] References Cited
UNITED STATES PATENTS

| | | |
|---|---|---|
| 1,678,643 | 7/1928 | Kassebeer.............................. 111/3 |
| 3,073,265 | 1/1963 | Movilla et al........................... 111/3 |
| 3,286,858 | 11/1966 | Julien................................... 111/2 X |
| 3,344,830 | 10/1967 | Longman............................... 111/3 X |
| 3,556,281 | 1/1971 | Margaroli et al................. 198/287 X |
| 3,702,664 | 11/1972 | Clement............................... 111/2 X |
| 3,714,700 | 2/1973 | Ehrenfellner.................... 198/287 X |

Primary Examiner—Stephen C. Pellegrino
Attorney, Agent, or Firm—Robert L. Farris

[57] ABSTRACT

Sugar cane planter for planting cane billets produced by a chopper type cane harvester. Billets in random orientation in a hopper are raked by an operator onto a conveyor belt. The billets are aligned parallel to the direction of travel of the conveyor by the combined effect of walls along side the conveyor and a driven roller between the walls and having rubber paddles. The billets engage a stop and are lifted over the stop and thereby fed to a furrow in the ground at a desired rate by a cam-operated lifter mechanism.

7 Claims, 7 Drawing Figures

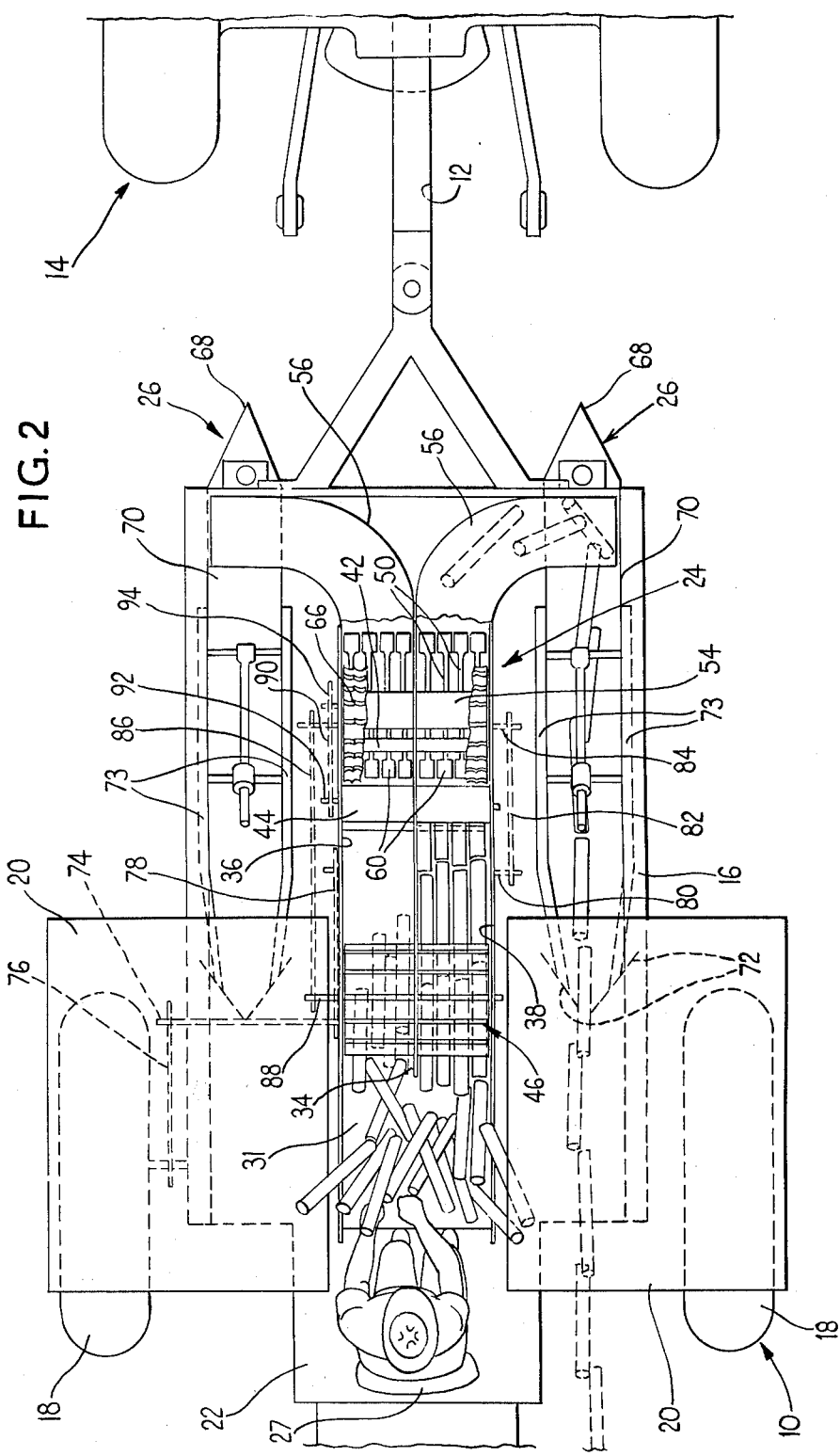

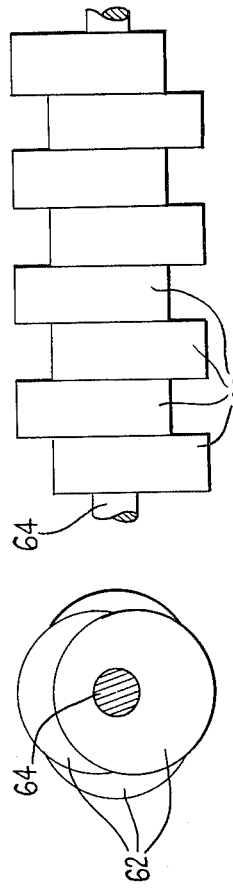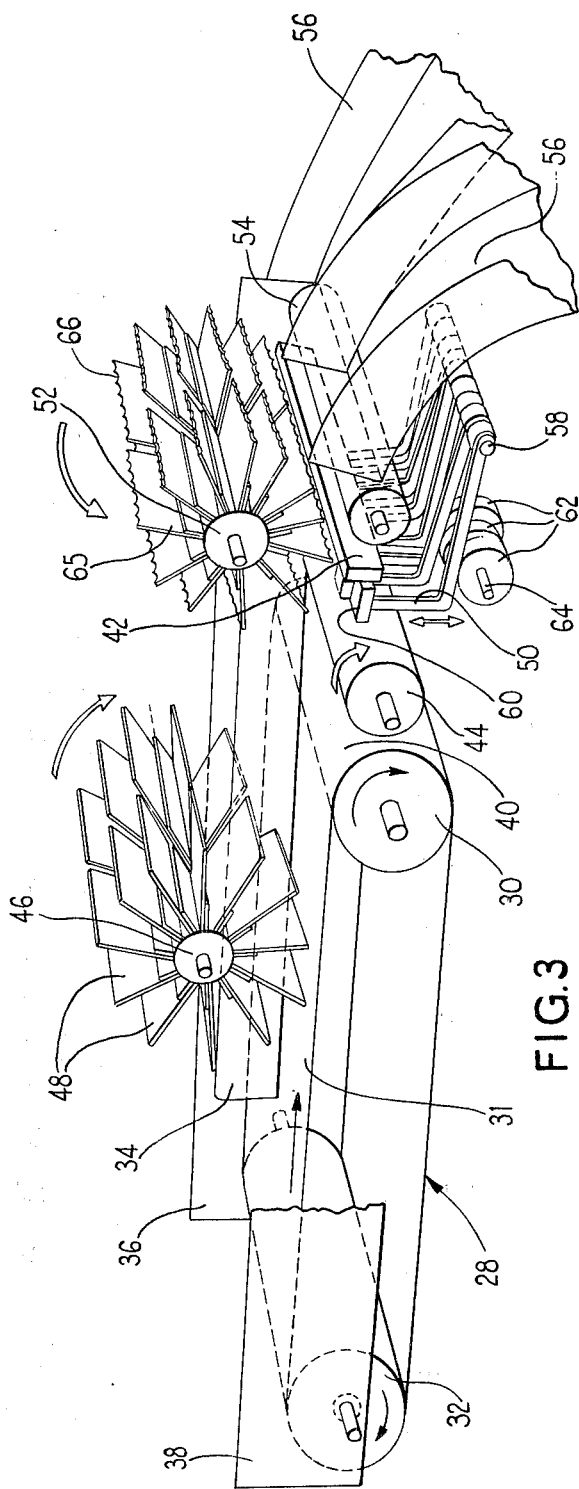

DISPENSING ROD LIKE ARTICLES

This invention relates to apparatus for dispensing rod-like articles, and in particular, though not exclusively, to an implement suitable for planting lengths of sugar cane or similar rod-like material such as cassava (referred-to herein as "billets").

Sugar cane is usually grown from billets 30 to 45 centimetres in length placed end to end in a furrow and covered with soil.

In the past, sugar cane billets have been planted either by hand, which is a slow and laborious process, or by means of mechanical planters. While the mechanical planters have had some success, they have nevertheless suffered from certain disadvantages since they have required either several persons to operate them or have required too much pretreatment of the cane before planting.

An object of the present invention is to provide apparatus suitable for use in a can planter for dispensing billets from a mass of billets in random orientations whereby a sugar cane crop which has been harvested by a harvester which cuts the cane sticks into billets can be planted with the minimum of labour.

According to one aspect of the invention there is provided apparatus for dispensing rod-like articles comprising a conveyor arranged to receive said articles in random orientation and operative to convey them in a desired direction, and feed means arranged to receive said articles from the conveyor and operative to feed them in a desired direction at a desired rate characterized by article alignment means positioned to act upon the articles while they are carried by the conveyor and operative to effect a regular orientation of the articles.

The provision of alignment means which acts on the rod-like articles while they are carried by the conveyor has the result that the articles are supplied to the feed means in a regular fashion and this greatly simplifies the structure needed in the feed means to enable the articles to be fed in a chosen direction and at a predetermined rate.

Preferably the alignment means comprises a drivably rotatable element mounted for rotation about an axis transverse to the direction of movement of articles on the conveyor and having resilient paddle members for engagement with the rod-like articles. The rotatable element is arranged to be driven in a direction such that the portion of said element nearest the conveyor moves in the opposite direction to the conveyor.

It will be appreciated that although certain potato planters have been proposed having some features in common with the present invention, the technical problems involved in planting cane are completely different from those involved in planting potatoes. These differences arise principally from the difference in shape of the articles to be planted. Whereas the shape of potatoes allows them to be easily individually sorted out and moved in a desired direction, the somewhat irregular rod-like shape of cane billets leads both to a tendency to become tangled and to resistance to attempts to sort and convey the billets.

An embodiment of the invention will now be described by way of example with reference to the accompanying drawings in which:

FIG. 2 shows the planter of FIG. 1 in plan view and with certain components removed or partly cut away for purposes of illustration.

FIG. 3 is a persepctive view of the cane billet dispensing mechanism of the planter of FIGS. 1 and 2;

FIGS. 4 and 5 show plan and end views, respectively, of a series of cams forming part of the mechanism of FIG. 3;

Figure 1:
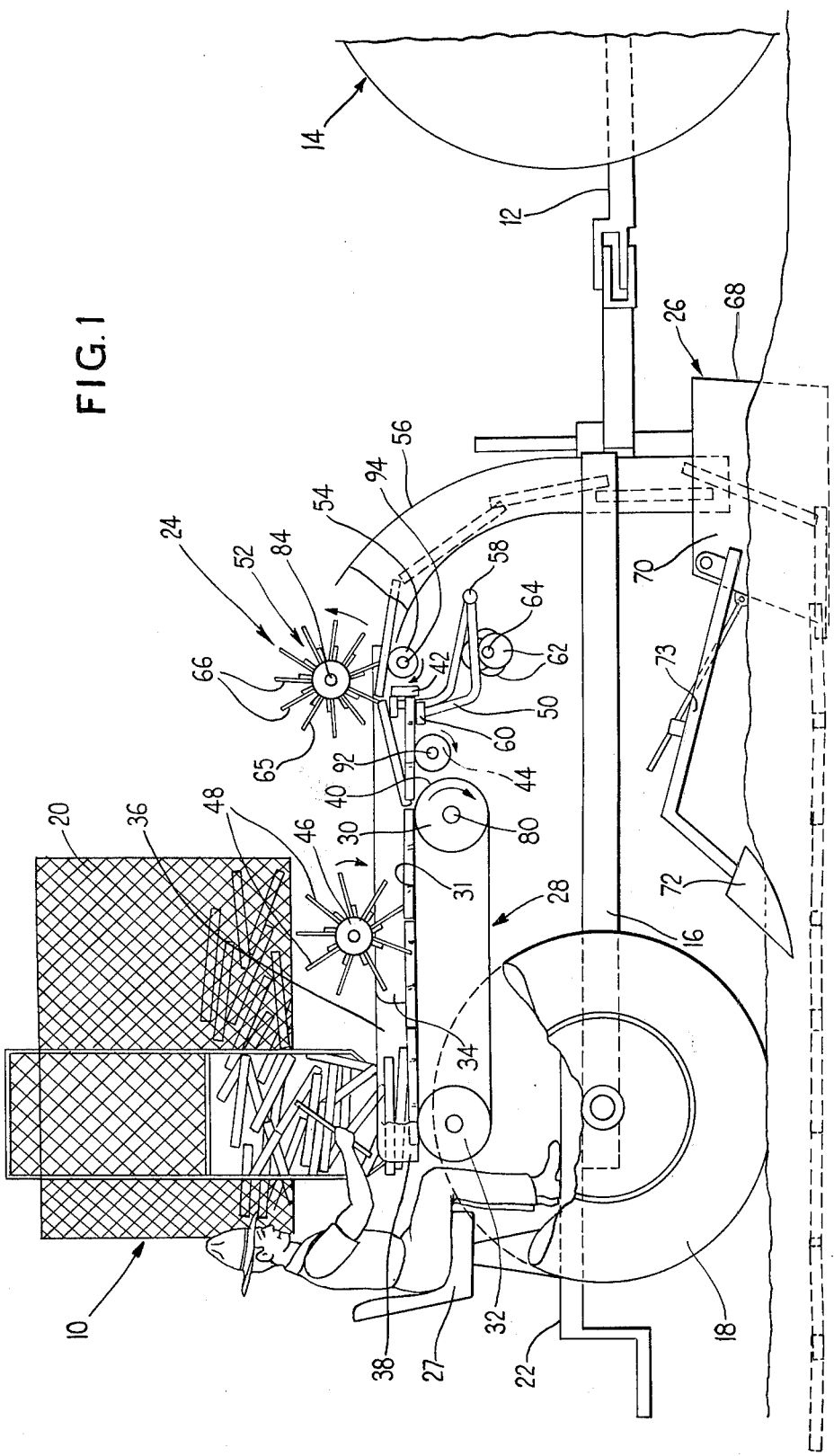
FIG. 1 shows diagrammatically a side elevational view of a cane planter pulled by a tractor, with one of two cane hoppers of the planter removed and other parts cut away for purposes of illustration.

With reference to the drawings, a sugar cane planter 10 hitched to the drawbar 12 of a tractor 14 comprises a frame 16 mounted on a pair of ground wheels 18. A pair of bins or hoppers 20 for sugar cane billets are mounted on frame 16 above wheels 18.

Planter 10 further comprises a platform 22 for an operator, a billet dispensing mechanism 24 and a pair of transversely spaced furrow opening and closing assemblies 26. An operator sitting on a seat 27 rakes billets onto the dispensing mechanism which feeds them at a desired rate to the assemblies 26 for deposition in the ground.

As shown in FIG. 3, billet dispensing mechanism 24 comprises a conveyor belt 28 trained around end rollers 30, 32. Belt 28 is about 12 inches wide and has its upper run 31 divided into two 6 inch width portions by an upright divider wall 34. A pair of side walls 36, 38 are provided one at each side of run 31 and extend beyond the discharge end 40 of belt 28 to devine a 12 inch wide feed channel divided centrally by wall 34.

A transverse stop 42 is fixed at a distance from the discharge end 40 of belt 28 which is slightly less than the minimum length of a billet to be planted, and at a position such that it is horizontally aligned with the top surface of the belt in its upper run 31. The stop extends across the full width of the two feed channels defined by walls 34, 36, 38.

Between the stop 42 and the discharge end 40 of belt 28 is a transverse rotatable support roller 44 to support billets discharged from the end of the belt.

A feed-levelling and billet alignment device constituted by a roller 46 carrying a series of rubber paddles 48 is provided above upper run 31 of the belt 28. Roller 46 extends across the full width of the conveyor belt and is mounted so that its spacing above the top surface of the upper run 31 thereof may be adjusted from a normal clearance of about 2¼ inches. The paddles 48 are each divided centrally to accommodate the partition wall 34.

Billet feeding means comprising eight intermittently operable billet-lifting feed members 50, a discharge paddle roller 52 a discharge support roller 54, and a pair of diverging feed channels 56, are provided to feed billets from conveyor belt 28 to furrow opening and closing assemblies 26.

Each billet lifter 50 is in the form of a generally L shaped rigid member freely pivoted at one end on a transverse pivot shaft 58. At its other end, each feed member has a 1 1/2 inch width billet engaging abutment 60. The arrangement is is such that the abutments extend side by side across the full width of the two feed channels defined by side walls 36, 38 and dividing wall 34.

Eight cylindrical cams 62 eccentrically mounted on a common shaft 64 are provided to actuate the billet lifters 50. Successive cams are arranged so as to be 90° out of phase with respect to each other, as shown in FIGS. 4 and 5. The billet lifters 50 rest on the cams and are lifted in turn as the shaft 64 is rotated.

Discharge paddle roller 52 carries eight axially-extending rubber paddles 65 each having serrations formed along its outer edge 66 to assist in gripping the cane billets and each having a central radial slot formed therein to accommodate the end of divider wall 34. Discharge support roller 54 is a plain cylindrical roller.

The soil working assembly 26 comprises a wedge shaped opener 68 preceding a cane-receiving boot 70 and followed by a pair of covering members 72 mounted on arms 73 pivotally connected to the boot.

Drive to the various mechanisms is taken from the planter's ground wheels 18. As shown in FIG. 2, a counter shaft 74 is driven by a chain 76 from the left hand ground wheel 18 of the planter and is connected by a chain 78 to a shaft 80 of end roller 30. A chain 82 drivably connects the other end of shaft 80 with one end of a drive shaft 84 of paddle discharge roller 52. A belt 86 drivably interconnects the other end of shaft 84 with a drive shaft 88 of paddle roller 46. Belt 86 is crossed, to reverse the drive direction. A chain 90 transmits drive from shaft 84 to the drive shafts 92, 94 of rollers 44 and 54 respectively and to camshaft 64.

In operation, as the planter is drawn by tractor 14, the planter operator rakes billets from hoppers 20 onto belt 28. The billets are divided into two separate streams and partially aligned by divider wall 34 and side walls 36, 38.

Paddle roller 46 is position-adjusted to be spaced above the belt by 1½ billet widths and allows only a one billet-thick layer of cane to pass under it and together with walls 34, 36 38 exerts analigning effect on the billets whereby the layer of billets emerging from under the roller consists of billets arranged in close side by side and head to trail relationship across the full width of each half of the feed channel. In this case, as the billets average 1½ inches thick there are four billets across the width of each half of the feed channel.

The billets pass over the discharge end 40 of the belt, over support roller 44 and engage stop 42. Billet lifters 50 then successively raise one end of each billet into the nip between, on one side, paddles 65 of roller 52, and on the other side, roller 54 and the stop 42. Each billet so lifted is fed by the roller 52 and pushed by the billets behind it into one of the feed channels 56 which guide it to one of the furrow assemblies 26 where it is deposited in the ground and covered over with soil.

Figure 6:
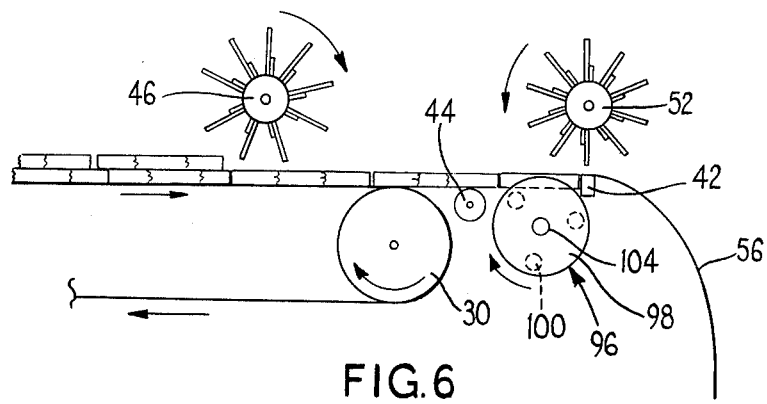
FIG. 6 shows, in side elevation, a modified billet dispensing mechanism, forming another embodiment of the invention.
Figure 7:
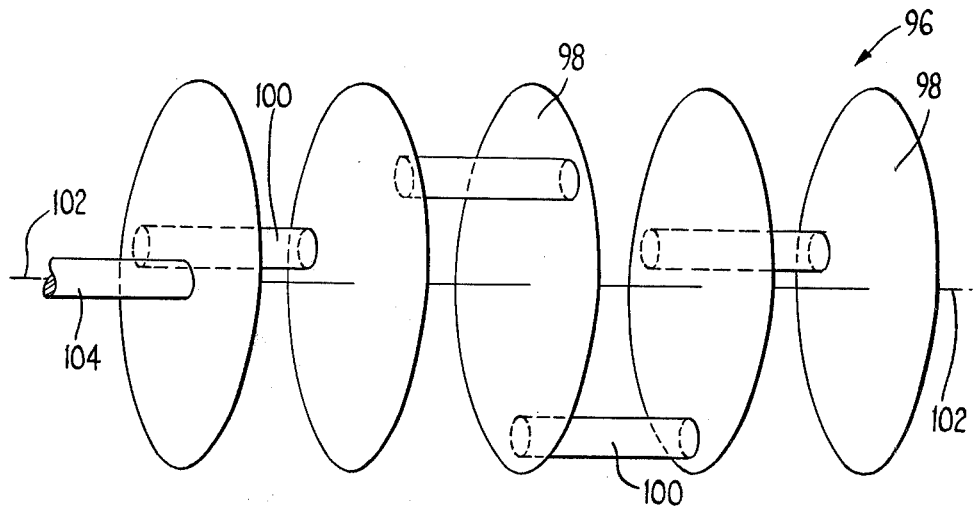
FIG. 7 shows a perspective view of part of the mechanism of FIG. 6.

In the embodiment of FIGS. 6 and 7 the billet dispensing mechanism is otherwise constructed and arranged as described above, but cams 62 and billet lifters 50 are replaced by a drivably rotatable feed element 96 arranged to act directly on the billets. Discharge support roller 54 is eliminated.

Feed element 96 comprises a series of discs 98 spaced at about two inch intervals and interconnected by rubber-covered feed rods 100, one between each pair of discs. Successive rods 100 are angularly offset by 120° about the axis 102 of rotation of element 96. The rods 100 are each located at the same radial distance from axis 102.

Stub shafts 104 on axis 102 are provided at each end of feed element 96 whereby it is mounted and driven in a manner similar to that of the cams 62.

In use, a single billet of cane is fed between each pair of discs. The discs act as guides for the cane. The billets are successively lifted by the rubber-covered rods 100 over stop 42 and fed forward into the nip between discharge roller 52 and stop 42.

Feed element 96 effects more positive feeding of the billets forwards and over stop 42 then the corresponding mechanism in the previous embodiment.

It will be understood that a cane planter according to the invention can be constructed to plant 1, 2 or more rows of cane simultaneously. The rate of feed of cane to each row (and hence the planting density) can be changed by changing the ratio of the drive transmitted from the ground wheels by chain 76 or even by merely changing the ratio of the drive to camshaft 64. The planter could equally well be driven from the p.t.o. shaft of a tractor in which the p.t.o. speed is proportional to the tractor's ground speed. The planter could also be provided with automatic means for feeding cane from the hoppers to the conveyor belt. Furthermore, the billet lifters can each have a cane-engaging surface wider than one piece of cane so as to lift and discharge two or more pieces of cane each time it is actuated — if desired.

I claim:

1. A sugar cane planter for planting sugar cane billets including a frame, at least one furrow opening means mounted on the frame, a billet container with a billet outlet for storage of randomly oriented sugar cane billets mounted on the frame; conveyor means for conveying sugar cane billets from the billet container to the furrow opening means including a continuous belt conveyor mounted on the frame with a portion of the belt positioned below the billet outlet from the billet container; alignment means including at least two side walls mounted on the frame directly above the continuous belt conveyor and spaced apart a distance less than the length of the major portion of the sugar cane billets to form a channel with the conveyor belt as the bottom of said channel and the side walls as the sides of said channel, said channel having a long axis that is generally parallel to the long axis of the continuous conveyor to orient the billets so that their long axes are generally parallel to the long axis of the channel; and a metering mechanism mounted on the frame adjacent to the delivery end of the continuous belt conveyor for metering cane billets from the continuous belt conveyor, said metering mechanism including a stop positioned to intercept aligned billets fed toward the stop by the continuous belt conveyor, a movable feed member positioned for engagement with sugar cane billets that are in engagement with the stop and actuating means for operating the feed members to dislodge sugar cane billets from said stop.

2. The sugar cane planter of claim 1 wherein the alignment means includes roller means mounted on the frame above the continuous belt conveyor for rotation about an axis transverse to the direction of movement of billets on the conveyor, said roller means including paddle members which are engageable with sugar cane billets moved by the continuous belt conveyor to allow only a one cane billet-thick layer of cane to pass.

3. The sugar cane planter of claim 2 wherein the paddle members are resilient.

4. The sugar cane planter of claim 1 wherein the movable feed member is an arm that is pivotally supported by the frame.

5. The sugar cane planter of claim 1 wherein the actuating means for operating the feed members is a cam.

6. The sugar cane planter of claim 4 wherein the actuating means is a cam that is engageable with said arm.

7. The sugar cane planter of claim 1 wherein the metering mechanism includes a plurality of movable feed members and a plurality of actuating means.

* * * * *